(12) United States Patent
Schmalz et al.

(10) Patent No.: US 8,295,163 B1
(45) Date of Patent: Oct. 23, 2012

(54) REASSIGNING SIGNALS TO CABLE CHANNELS

(75) Inventors: Joachim Schmalz, Bischweier (DE); Olaf Mater, Eggenstein-Leopoldshafen (DE)

(73) Assignee: Marvell International Ltd. (BM)

( * ) Notice: Subject to any disclaimer, the term of this patent is extended or adjusted under 35 U.S.C. 154(b) by 835 days.

(21) Appl. No.: 12/266,607

(22) Filed: Nov. 7, 2008

Related U.S. Application Data (60) Provisional application No. 60/988,595, filed on Nov. 16, 2007.

(51) Int. Cl.
*G01R 31/11* (2006.01)
*G01R 31/02* (2006.01)
*H04L 12/26* (2006.01)

(52) U.S. Cl. ........ 370/225; 370/242; 370/248; 370/249; 370/252; 324/533; 324/534

(58) Field of Classification Search .................. 370/216, 370/225, 241, 242, 248, 249, 252; 324/534, 324/535, 539, 543, 527, 533
See application file for complete search history.

(56) References Cited

U.S. PATENT DOCUMENTS

| | | | | |
|---|---|---|---|---|
| 4,970,466 A * | 11/1990 | Bolles et al. | ................... | 324/533 |
| 5,982,595 A * | 11/1999 | Pozzuoli | .......................... | 361/62 |
| 6,275,510 B1 * | 8/2001 | Koenig et al. | ................. | 370/535 |
| 6,825,672 B1 * | 11/2004 | Lo et al. | ......................... | 324/533 |
| 7,289,449 B1 * | 10/2007 | Rubinstein et al. | ........... | 370/245 |
| 7,477,611 B2 * | 1/2009 | Huff | ............................... | 370/252 |
| 7,977,951 B1 * | 7/2011 | Lo et al. | ........................ | 324/543 |
| 2004/0066202 A1 * | 4/2004 | Pereira et al. | ................. | 324/539 |
| 2004/0198105 A1 * | 10/2004 | Dove | ............................. | 439/894 |
| 2006/0182439 A1 * | 8/2006 | Hernandez | ........................ | 398/9 |
| 2007/0022331 A1 * | 1/2007 | Jamieson et al. | ............. | 714/712 |
| 2007/0255819 A1 * | 11/2007 | Hua et al. | ...................... | 709/224 |
| 2008/0013457 A1 * | 1/2008 | Berman et al. | ................. | 370/245 |
| 2008/0265915 A1 * | 10/2008 | Clark et al. | .................... | 324/699 |
| 2010/0232298 A1 * | 9/2010 | Karam | ........................... | 370/241 |

* cited by examiner

*Primary Examiner* — Chi Pham
*Assistant Examiner* — Ahmed Elallam (57) ABSTRACT

Devices, systems, methods, and other embodiments associated assigning signals to cable channels are described. One example device includes a networking device that includes a transceiver to connect to a cable and communicate signal over the cable to a remote terminal. The cable can include two or more cable channels to carry signals. If a cable channel fails to operate, a switching logic reassigns signals initially carried on the failed cable channel to another cable channel.

42 Claims, 4 Drawing Sheets

REASSIGNING SIGNALS TO CABLE CHANNELS

CROSS REFERENCE TO RELATED APPLICATIONS

This application claims the benefit of U.S. provisional application Ser. No. 60/988,595 filed on Nov. 16, 2007, which is incorporated by reference in its entirety.

BACKGROUND

Computing devices are typically connected to a network with a network connection device. In one example, the network connection device is an Ethernet network device that connects a device to an Ethernet network. Some network connection devices communicate over a physical network cable. The cable may have multiple cable channels (e.g. multiple wires) that can carry different signals.

To standardize network wiring, organizations such as the Institute of Electrical and Electronics Engineers (IEEE) have created standards that assign signals to specific cable channels. Network devices that operate with the standard will transmit and receive signals on pin connections that correspond to the assigned cable channels. However, when even a single channel becomes inoperable (e.g. one wire breaks), communication over the cable may not function properly or may even become entirely inoperable.

SUMMARY

An example embodiment includes a networking device comprised of a network interface to connect to a cable and communicate over the cable to a remote terminal. The cable includes two or more cable channels to carry signals. The network device further includes a cable tester and a switching logic. The cable tester is configured to test whether a cable channel has failed. Upon detecting a failed cable channel, the switching logic reassigns signals initially carried on the failed cable channel to another cable channel in the cable.

Another embodiment includes a negotiation logic to negotiate with the remote terminal to reassign the signals from the failed cable channel to the second cable channel.

In another embodiment, the negotiation logic is configured to negotiate assigning fewer signals on fewer cable channels in the cable, upon detecting the failed cable channel.

In one embodiment, the negotiation logic is configured to negotiate operating the two or more cable channels at a lower operating speed, upon detecting the failed cable channel.

In another embodiment, the negotiation logic is configured to use at least one channel that is operational to communicate with the remote terminal connected to the other end of the cable.

In some embodiments, the network interface is operable to be configured to communicate signals to the cable as defined by the 1000Base-T signaling standard. Upon the detecting the failed cable channel, the network interface is further operable to be configured to communicate signals to the cable at speeds defined by one of: the 100Base-TX signaling standard or the 10Base-T signaling standard.

In one embodiment, the switching logic is configured to cause the network interface to reconfigure signal communications from a first communication protocol to a different communication protocol that uses fewer cable channels.

In another embodiment, the port is configured to interface to a registered jack RJ45 having eight pins representing cable channels one, two, three and four. The switching logic is further configured to connect the first cable channel to pin numbers four and five, the second cable channel to pin numbers three and six, the third cable channel to pin numbers one and two, and the forth cable channel to pin numbers seven and eight.

In another embodiment, the switching logic is operable to reassign a failed cable channel on cable channels two or three to channels one or four.

In some embodiments, the cable tester is a Virtual Cable Tester (VTC) for detecting a failed cable channel.

In another embodiment, the network device further includes a timer configured to determine a time value since previous signal activity on the failed cable channel. The failed cable channel is then tested by the cable tester upon the time value exceeding a predetermined time value.

In another embodiment, the cable tester is configured to transmit a test signal on the first cable channel in order to measure a signal amplitude and to calculate a length the test signal travels. The cable tester is further configured to determine where the failed cable channel has failed based on the signal amplitude and the length.

In one embodiment, the cable tester is configured to measure an amplitude of a reflected signal derived from the test signal.

In one embodiment, the network interface is operable to communicate the reassigned signals over the second cable channel at a slower speed than when the signals were communicated over the first cable channel.

In one embodiment, the network interface is configured to operate the failed cable channel at about a 1000 Megabits/second rate before the channel failed. The network interface is also configured to operate the another cable channel at about a 10 Megabits/second rate or about a 100 Megabits/second rate.

In another embodiment, the network interface includes pins configured to connect to four twisted pairs of wire with each pair associated with a cable channel.

In another embodiment, the networking device includes a negotiation logic operable to cause the remote terminal to be reconfigured to operate with the reassigned signals on the second channel.

In one embodiment, the networking device is at least one of Institute of Electrical and Electronic Engineers (IEEE) 802.3ab, 802.3i, and 802.3u compliant.

In another embodiment, the network device is implemented in one of a high definition television, a vehicle, a cellular phone, a set top box, a media player, and Voice over Internet Protocol (VoIP) phone.

In one embodiment, the network interface is configured to connect to a Category 5 (Cat 5) cable.

In another embodiment, the network device is a PHY-Transceiver.

Another example embodiment includes a method. The method includes transmitting and receiving signals over a cable, where the cable includes multiple cable channels; determining that a first cable channel is inoperable; and reassigning signals initially carried on the first cable channel to a second cable channel in the cable.

In one embodiment, the transmitting and receiving is performed by a local PHY-Transceiver connected at one end of the cable that communicates with a remote PHY-Transceiver connected to the cable. The method further includes, responsive to determining that the first cable channel is inoperative, causing the remote PHY-Transceiver to negotiate a reassignment of signals to the second cable channel.

Another embodiment includes a PHY-Transceiver. The PHY-Transceiver includes a port to connect to a cable and communicate over the cable to a remote PHY-transceiver. The cable includes two or more twisted pairs of wire to carry signals. Upon detecting a first twisted pair which is a failed twisted pair, a switching logic within the PHY-Transceiver is configured to reassign signals initially carried on the failed twisted pair to a second twisted pair in the cable.

In one example embodiment a system includes a means for transmitting and receiving signals over a cable with a local PHY-Transceiver connected at one end of the cable. The cable includes multiple cable channels, and is connected at the opposite end to a remote PHY-Transceiver. The system includes a means for testing the multiple cable channels and a means for determining that a first cable channel is inoperable. Additionally, the system includes a means responsive to determining that the first cable channel is inoperative, for causing the remote PHY-Transceivers to negotiate the second cable channel with the local PHY-Transceiver. A means is included in the system for reassigning signals initially carried on the first cable channel to a second cable channel to carry signals in the cable.

In one embodiment, a system includes a means for transmitting and receiving signals over a cable where the cable includes multiple cable channels for communicating signals with a remote device. The embodiment further include a means for testing the multiple cable channels as well as a means for determining that a first cable channel is inoperable. The system includes means for negotiating with the remote device to reassign signal communications from the first cable channel to a second cable channel in response to determining that the first cable channel is inoperable. Additionally, the embodiment includes means for reassigning signals initially carried on the first cable channel to the second cable channel.

BRIEF DESCRIPTION OF THE DRAWINGS

The accompanying drawings, which are incorporated in and constitute a part of the specification, illustrate various example systems, methods, and other example embodiments of various aspects of the invention. It will be appreciated that the illustrated element boundaries (e.g., boxes, groups of boxes, or other shapes) in the figures represent one example of the boundaries. One of ordinary skill in the art will appreciate that in some examples one element may be designed as multiple elements or that multiple elements may be designed as one element. In some examples, an element shown as an internal component of another element may be implemented as an external component and vice versa. Furthermore, elements may not be drawn to scale.

Table 1 illustrates one embodiment of signal assignments on a cable with four twisted pairs of wire.

DETAILED DESCRIPTION

Described herein are example systems, methods and other embodiments that respond to a failed cable channel. For example when a failed cable channel is detected, signals that were directed to the failed cable channel are reassigned to a different cable channel in the cable. Thus a more robust data transfer over a cable can be achieved by providing cable failover.

In one embodiment, a network device includes a network interface for connection with a cable that includes cable channels for carrying signals. The network device communicates over the cable to a remote terminal connected to the other end of the cable. The cable channels can be tested periodically to detect whether a cable channel has failed. For example, if a wire within the cable breaks, then the wire becomes inoperable and signals can no longer be transferred across the wire. When a channel has been detected as having failed, a switching logic will reassign signals initially carried on the failed channel to another operable channel.

Thus, when a channel becomes broken or otherwise inoperable, the cable can be made to still function and the network link does not completely fail. In another embodiment, if there are no unused or available cable channels, then the system attempts to assign a subset of the original cable signals from the failed channel to usable cable channels. Date transfer is then operated at slower signaling speeds than before the channel failure to accommodate the fewer channels.

The following includes definitions of selected terms employed herein. The definitions include various examples and/or forms of components that fall within the scope of a term and that may be used for implementation. The examples are not intended to be limiting. Both singular and plural forms of terms may be within the definitions.

References to "one embodiment", "an embodiment", "one example", "an example", and so on, indicate that the embodiment(s) or example(s) so described may include a particular feature, structure, characteristic, property, element, or limitation, but that not every embodiment or example necessarily includes that particular feature, structure, characteristic, property, element or limitation. Furthermore, repeated use of the phrase "in one embodiment" does not necessarily refer to the same embodiment, though it may.

ASIC: application specific integrated circuit.
CD: compact disk.
CD-R: CD recordable.
CD-RW: CD rewriteable.
DVD: digital versatile disk and/or digital video disk.
IEEE: institute of electrical and electronic engineers.
LAN: local area network.
PCI: peripheral component interconnect.
PCIE: PCI express.
RAM: random access memory.
DRAM: dynamic RAM.
SRAM: static RAM.
ROM: read only memory. PROM: programmable ROM.
EPROM: erasable PROM.
EEPROM: electrically erasable PROM.
USB: universal serial bus.
WAN: wide area network.
VCT: virtual cable tester.
VoIP: voice over internet protocol.

"Computer-readable medium", as used herein, refers to a medium that stores signals, instructions and/or data. A computer-readable medium may take forms, including, but not limited to, non-volatile media, and volatile media. Non-volatile media may include, for example, optical disks, magnetic disks, flash memory and so on. Volatile media may include, for example, semiconductor memories, dynamic memory, and so on. Common forms of a computer-readable medium may include, but are not limited to, a floppy disk, a flexible disk, a hard disk, a magnetic tape, other magnetic medium, an ASIC, a programmable logic device, a CD, other optical medium, a RAM, a ROM, a memory chip or card, a memory stick, and other media from which a computer, a processor or other electronic device can read.

"Logic", as used herein, includes but is not limited to hardware, firmware, software stored or in execution on a machine, and/or combinations of each to perform a function(s) or an action(s), and/or to cause a function or action from another logic, method, and/or system. Logic may include a software controlled microprocessor, a discrete logic (e.g., ASIC), an analog circuit, a digital circuit, a programmed logic device, a memory device containing instructions, and so on. Logic may include one or more gates, combinations of gates, or other circuit components. Where multiple logical logics are described, it may be possible to incorporate the multiple logical logics into one physical logic. Similarly, where a single logical logic is described, it may be possible to distribute that single logical logic between multiple physical logics.

An "operable cdnnection", or a connection by which entities are "operably connected", is one in which signals, physical communications, and/or logical communications may be sent and/or received. An operable connection may include a physical interface, an electrical interface, and/or a data interface. An operable connection may include differing combinations of interfaces and/or connections sufficient to allow operable control. For example, two entities can be operably connected to communicate signals to each other directly or through one or more intermediate entities (e.g., processor, operating system, logic, software). Logical and/or physical communication channels can be used to create an operable connection.

"Signal", as used herein, includes but is not limited to, electrical signals, optical signals, analog signals, digital signals, data, computer instructions, processor instructions, messages, a bit, a bit stream, or other means that can be received, transmitted and/or detected.

Some portions of the detailed descriptions that follow are presented in terms of algorithms and symbolic representations of operations on data bits within a memory. These algorithmic descriptions and representations are used by those skilled in the art to convey the substance of their work to others. An algorithm, here and generally, is conceived to be a sequence of operations that produce a result. The operations include physical manipulations of physical quantities. Usually, though not necessarily, the physical quantities take the form of electrical or magnetic signals capable of being stored, transferred, combined, compared, and otherwise manipulated in a logic, and so on. The physical manipulations create a concrete, tangible, useful, real-world result.

Figure 1:
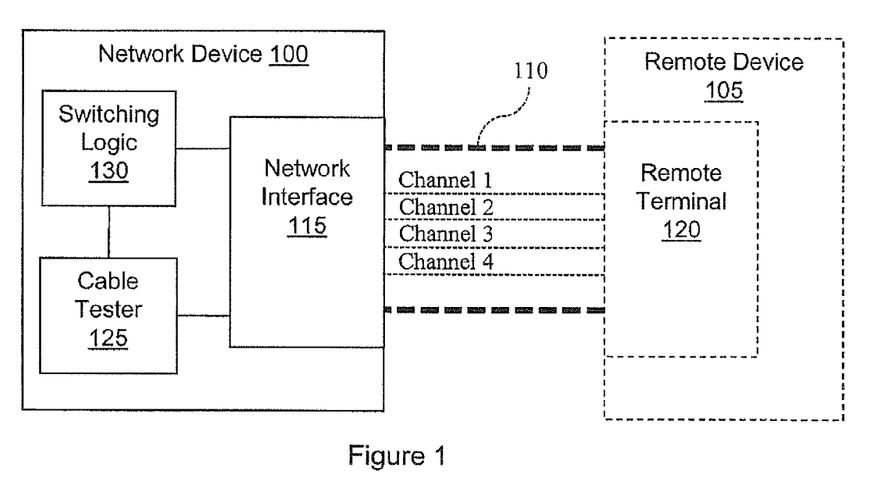
FIG. 1 illustrates one embodiment of a network device associated with reassigning signals to cable channels.

With reference to FIG. 1, one embodiment is illustrated of a network device 100 configured to handle failed cable channels. For example, the network device 100 provides communication with a remote device 105 connected through a cable 110. The cable 110 can include two or more cable channels (e.g. channels 1, 2, 3, 4, etc.). In one embodiment, each cable channel is defined by a cable wire that can carry electrical signals. In other embodiments, a cable channel can be defined as a twisted pair of wire. The network device 100 includes a network interface 115 that provides an interface to the cable 110 and communicates signals to and from a remote terminal 120. In one or more embodiments, the network interface 115 and/or the remote terminal 120 may include a transceiver.

As will be described in more detail below, the network device 100 is configured to provide a cable failover feature that reassigns signals from a failed cable channel to another cable channel in the cable. In this manner, data transfer and signal communications over the cable can continue even though one channel no longer operates. In the figure, the remote device 105 and the cable 110 are shown in dashed lines because they are not part of the network device 100.

In one embodiment, the network device 100 includes a cable tester 125 to test the cable channels in the cable 110 to detect whether a cable channel has failed. Upon detecting a failed cable channel, a switching logic 130 is configured to reassign signals initially carried on the failed cable channel to a second cable channel in the cable. In some embodiments the cable tester 125 and the switching logic 130 may be included in the network interface 115.

In general when the devices communicate, a standard communication interface may be used that requires specific signals to be located on certain channels within the cable 110. For example, the IEEE 802.3i and 802.3u standards require the use of a cable with four twisted wire pairs. These standards assign the transmit signals to be on twisted pair three (e.g. channel three) and the receive signals to be on twisted pair two (e.g. channel two). The IEEE 802.3i and 802.3u standards are also known as the 10Base-T and 100Base-TX signaling standards, respectively.

If a channel within the cable 110 become inoperable and if the inoperable channel is carrying a signal according to a standard, then the cable 110 (e.g. the link) becomes inoperable or at least produce communication errors. If the network device 100 follows a standard such as the IEEE 802.3i standard that only permits certain signals on a specific channels, then the link will remain broken until the cable 110 is physically repaired or replaced.

However, a more robust communication link can be created by the network device 100. When a channel fails, the network device 100 is configured to check for unused channels within the cable 110 that are still functional. If there are unused channels, then the network device 100 can transfer signals from the inoperable channel to an operable unused channel. Even though the signaling standard is not strictly followed since some signals are not on their assign channels, the link remains operational.

With continued reference to FIG. 1, in one embodiment for testing the channels, the cable tester 125 is configured to transmit a test signal(s) on a cable channel and then measure signal properties from the cable channel. Based on the signal properties, the cable tester 125 can determine if the channel is functioning or not. For example, a test signal can be transmitted on a channel and the cable tester 125 can calculate a length the test signal travels. The length the test signal travels will correspond to where a channel ends and thus where the wire has failed (e.g. a break point in the wire).

For example, the cable length may be calculated by the cable tester 125 by first causing the network interface 115 to send a test pulse to a selected cable channel. Next, the time lapse from sending the test pulse to receiving a reflected pulse back at the network interface 115 is measured. By knowing the time lapse and the speed of the signal, a round-trip distance traveled is calculated. Dividing the distance by two give's a one-way distance of the channel. A shorter than expected distance can indicate a cable break. The cable tester 125 can also be configured to measure an amplitude of the reflected signal derived from the test signal. A measured amplitude that does not fall within an expected range may further indicate that the cable channel is not operating properly. The cable tester 125 then determines if the cable 110 has a failed channel based on the signal amplitudes and/or the measured lengths of each channel. In one embodiment, the cable tester 125 is a Virtual Cable Tester (VCT) produced by Marvell Semiconductor Inc.

When the cable tester 125 detects an inoperable cable channel, a signal can be set that causes the switching logic 130 to make channel reassignments. For example, the switching logic 130 will attempt to reassign signals initially carried on the inoperable channel to another cable channel that is functioning. In one embodiment, the switching logic 130 can first try to identify any unused channels on the cable 110 and if available, then reassign the signals from the failed channel to the unused channel. The network interface 115 is then reconfigured to communicate the signals initially assigned on the failed channel to the unused channel. The network interface 115 will also negotiate with the remote terminal 120 to make the same channel reassignments to synchronize communications.

By reassigning the signals to an unused channel, it is possible for the network interface 115 to still transmit and receive signals to and from the cable 110. In other embodiments, when all the channels on the cable 110 are being used and an inoperable channel is detected, the cable 110 may still be operable by reassigning multiple channels. In one embodiment, the reassigning can include reconfiguring the network interface 115 to communicate signals using a different communication protocol than originally used. For example, the switching logic 130 can be configured to cause the network interface 115 to reconfigure signal communications from a first communication protocol to a different communication protocol that uses fewer cable channels. In this manner, the failed cable channel can be avoided with a protocol that does not use the failed channel. In another embodiment, the network interface 115 may have to interface with the cable 110 at slower speeds so as to use only the functioning channels and avoid the failed channel.

Consider for example one embodiment where the network device 100 implements the IEEE 802.3ab standard on the cable 110 that includes four twisted pairs of wires. This standard, also known as 1000Base-T signaling, transmits data at the rate of one gigabit per second. As shown below in table 1, all four channels of the cable 110 (e.g. connected to eight pins) are used when implementing the standard. In this case, if a channel is found to be inoperable, then there are no unused/spare channels and the 1000Base-T standard will not function with the inoperable cable 110. However, the network interface 115 can be reconfigured to communicate over the cable 110 to operate with fewer channels at slower signaling speeds using a different protocol. Table 1 is shown as an example of one embodiment only and other embodiments may use other standards with a different number of twisted pairs or even cables not using twisted wire pairs, for example fiber optic cables.

For example, when all four twisted pairs are being used and one twisted pair fails, then the network interface 115 can be reconfigured to operate with the cable 110 using only two twisted pairs (e.g. two channels) by changing the communication protocol to one that uses fewer than four channels (e.g. the IEEE 802.3u (100Base-TX) standard). As shown in table 1, the 100Base-TX standard uses twisted wire pairs two and three, with pairs one and four unused. Since only two channels are needed with the 100Base-TX protocol, the other channels can fail and communications can continue. Thus in one embodiment, when the cable tester 125 detects a failed channel, the switching logic 130 can switch communications from the 1000Base-T standard to the 100Base-TX standard and use only two channels/cable pairs. Of course, switching to the 100Base-TX standard causes the network interface 115 to reduce the data transmission speed of the cable 110 from one gigabit/second to one hundred megabits/second.

TABLE 1

| RJ 45 Pin # | Pair # (channel) | Wire Color | 10Base-T Signal/ 100Base-TX Signal | 1000Base-T Signal |
|---|---|---|---|---|
| 1 | 3 | White/Green | Transmit+ | BI_DA+ |
| 2 | 3 | Green | Transmit− | BI_DA− |
| 3 | 2 | White/Orange | Receive+ | BI_DB+ |
| 4 | 1 | Blue | Unused | BI_DC+ |
| 5 | 1 | White/Blue | Unused | BI_DC− |
| 6 | 2 | Orange | Receive− | BI_DB− |
| 7 | 4 | White/Brown | Unused | BI_DD+ |
| 8 | 4 | Brown | Unused | BI_DD− |

In another example, consider the network device 100 implementing the 1000Base-T standard, which uses all four channels in the cable 110. If channel three was determined to be inoperable, then the 100Base-TX standard could not be implemented directly by the network device 100 since channel three is part of the standard. In this case, the switching logic 130 may determine that because there are still at least two good pairs of channels (e.g. channels one, two, and four) then any two of these channels may be used to implement a signaling standard equivalent to the 100Base-TX standard. For example, cable channel two may still be used to carry signals Receive+/Receive− according to the standard. However, channel 1 may be selected by the switching logic 130 to carry signals Transmit+/Transmit−. Because channel three does not carry signals Transmit+/Transmit−, the reassignment does not strictly follow the 100Base-TX standard as shown in table 1 but still uses two channels.

In another example, the cable 110 made of four twisted wire pairs may have twisted pairs one and two completely cut open and totally unusable. Twisted pair three may be completely operable at gigabit speeds, however, twisted pair four may be so badly damaged that the cable tester 125 determines that pair four may only operate at 10Base-T (10 megabit) speeds. In this example, the switching logic 130 can be configured to assign the 10Base-T signals Transmit+/Transmit− to twisted pair three and signals Receive+/Receive− to pair four. Of course, this does not explicitly follow the 10Base-T standard, but the network device 100 may still be operational with the cable 110.

When the network device 100 makes a channel assignment change, the remote device 105 must be aware of the change to properly communicate through the cable 110 with the network device 100. Thus in one embodiment, the channel reassignments will operate if the remote device 105 is able to detect that signals have been reassigned to new channel locations on the cable 110. In another embodiment, the network device 100 is configured to negotiate a new channel assignment or cause the remote device 105 to accept the new channel assignments. This will be further described with reference to FIG. 2.

It will be appreciated that in one or more embodiments the network device 100 may be implemented in an integrated circuit, an application specific integrated circuit (ASIC), a network interface, and so on. In another embodiment, the network device 100 can be implemented as an Ethernet device that connects a host to a network. In one example, the network device 100 is a PHY-Transceiver. In another embodiment, the network device 100 is configured to be compliant with one or more communication protocols, for example, Institute of Electrical and Electronic Engineers (IEEE) 802.3ab, 802.3i, 802.3u, and so on. In other embodiments, the network device 100 can be configured to be compliant with any suitable standard. In one embodiment the network interface 115 is configured to connect to an Ethernet cable (e.g. Category 5, 6 and so).

Figure 2:
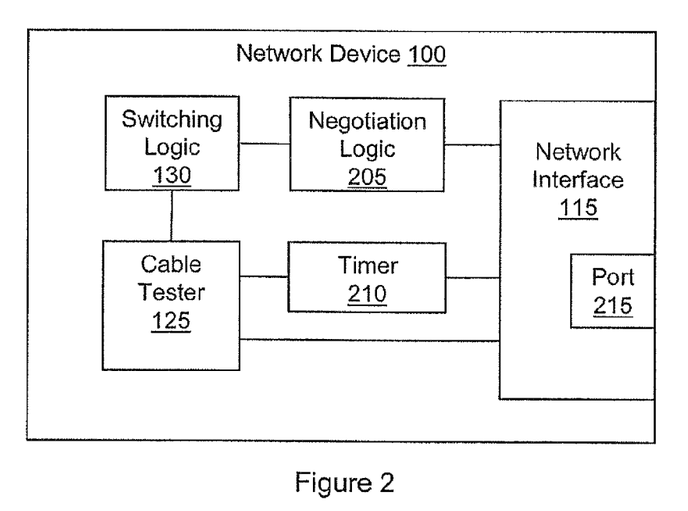
FIG. 2 illustrates another embodiment of a network device associated with reassigning signals to cable channels.

With reference to FIG. 2, another embodiment of the network device 100 is shown. The network device 100 includes a negotiation logic 205 to negotiate new cable assignments with the remote device 105. The negotiation will assure that if the switching logic 130 decides to assign a signal from an inoperable channel to a new channel, the remote device 105 is in agreement with the network device 100 or at least aware of the channel reassignment(s). The negotiation logic 205 may use at least one channel that is operational (e.g. has not failed) to communicate with the remote device 105 connected to the other end of the cable 110. If all the channels are being used before a failed channel is detected by the cable tester 125, then the negotiation logic 205 will negotiate assigning fewer signals on fewer cable channels in the cable 110. If a channel assignment will affect the communication speed, the negotiation logic 205 will negotiate operating the cable channels at a lower operating speed.

In another embodiment, the network device 100 further includes a timer 210 to control activation of the cable tester 125. The timer 210 may be configured to determine a time value since previous signal activity on a cable channel. The time since the last signal activity on a channel may be used to prompt the cable tester 125 to test that cable channel to determine if the channel is operational or not. In one example, the cable tester 125 will initiate a test when the time value for that channel exceeds a predetermined time value.

In some embodiments, the network interface 115 is configured to connect to a cable having four twisted pairs of wire where each pair is a cable channel. In one embodiment, the network interface 115 further includes a port 215 that is compatible with an RJ45 connector. In one embodiment, the port 215 includes eight pins grouped into four pairs of pins for connecting to the four cable channels (twisted pairs) in accordance with the pin assignments shown in Table 1. For example, the switching logic 130 is configured to connect the first cable channel to pin numbers four and five, the second cable channel to pin numbers three and six, the third cable channel to pin numbers one and two, and the forth cable channel to pin numbers seven and eight. The switching logic 130 is operable to reassign a failed cable channel on cable channels two or three to channels one or four. Of course, different pin assignments will be used for different cables and/or different communication protocols.

Figure 3:
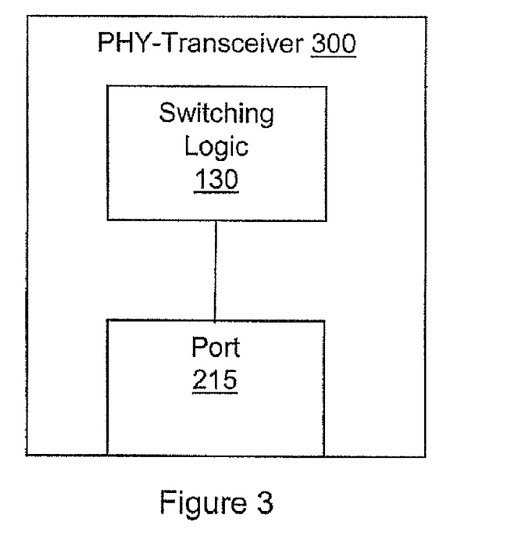
FIG. 3 illustrates one embodiment of a PHY-Transceiver associated with reassigning signals to cable channels.

FIG. 3 illustrates one embodiment of a PHY-Transceiver 300 that is configured to reassign signals between cable channels when a channel fails. In that regard, the PHY-Transceiver 300 is implemented to include the switching logic 130. In one embodiment, as discussed above for the network device 100, the PHY-Transceiver 300 is configured to communicate to a remote terminal over a cable having twisted wire pairs. The PHY-Transceiver 300 includes a port 215 to connect to the cable. In one embodiment, the port 215 is compatible with an RJ45 connector. When the PHY-Transceiver 300 detects a failed twisted pair, the switching logic 130 will reassign signals initially carried on the failed twisted pair to another operational twisted pair.

As discussed above for the network device 100 (shown in FIGS. 1 and 2), the PHY-Transceiver 300 may include a cable tester 125 to test the cable to detect a failed twisted pair. The timer 210 shown in FIG. 2 may be included within the PHY-Transceiver 300 to prompt the cable tester to begin testing a channel. The PHY-Transceiver 300 may also include a negotiation logic 205 (shown in FIG. 2) to negotiate another twisted pair with a remote PHY-Transceiver connected to the other end of the cable. The negotiation logic 205 may negotiate for a cable channel signal assignment as discussed above. In one embodiment, a signal to reassign channels sent from the PHY-Transceiver 300 to the remote PHY-Transceiver will cause the remote PHY-Transceiver to reassign signals at the remote PHY-Transceiver according to an assignment generated by the switching logic 130.

Figure 4:
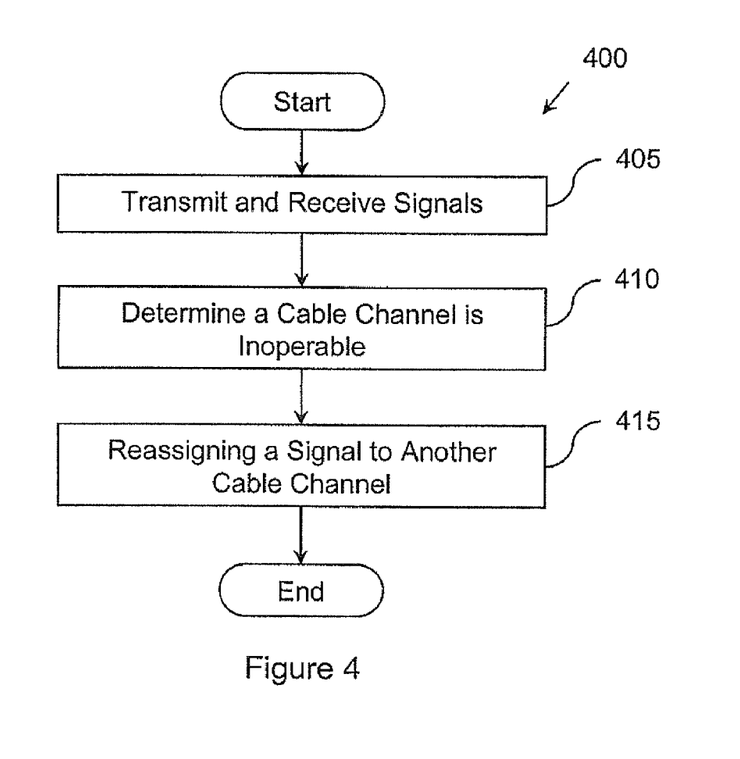
FIG. 4 illustrates one embodiment of a method associated with reassigning signals to cable channels.

FIG. 4 illustrates one embodiment of a method 400 associated with reassigning signals to a cable channel. At block 405, the method begins by transmitting and receiving signals over a cable, where the cable includes multiple cable channels. In one embodiment, the transmitting and receiving is performed by a local PHY-Transceiver connected at one end of the cable that communicates with a remote PHY-Transceiver connected to the cable.

The method 400 continues at 410 by determining that a cable channel is inoperable. The cable channel may be determined to be inoperable as discussed above. In one embodiment, test signals are transmitted over a channel and signal properties are measured. Based on the measured properties, it can be determined whether the channel is functioning. If the cable channel is determined to be inoperable, then at block 415, signals initially carried on the inoperable cable channel are reassigned to an operable cable channel in the cable.

As discussed above in one embodiment, the channel reassignment may be made according to any suitable IEEE signaling standard, cable speed, and/or any suitable cable. The channel reassignment may result in operating the cable channel with different cable channel speeds than before the reassignment. In some embodiments, fewer channels and signals may be assigned to the cable after the reassignment than initially used.

In another embodiment, the method 400 may include testing the cable channels to determine if the channels are all operational. A test signal may be transmitted from a local PHY transceiver on the failed cable channel to measure signal amplitude, calculate a length of the cable in which the test signal travels, and/or determine the cable channel status based on the measured amplitude and the length. The method 400 may further include determining a time since the last signal activity on a cable channel. If the time passes a predetermined time value, the cable channel is then tested.

Figure 5:
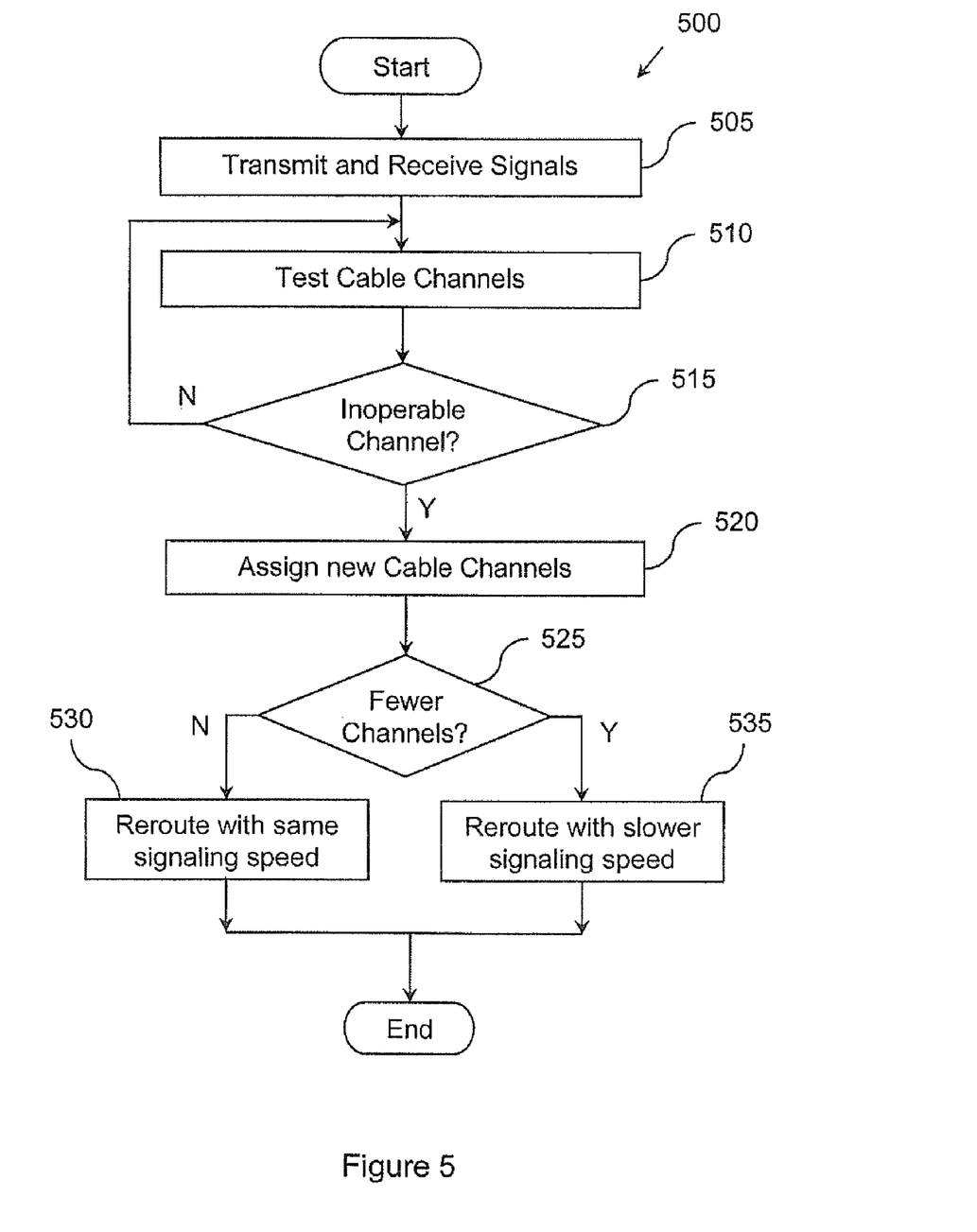
FIG. 5 illustrates another embodiment of a method associated with reassigning signals to cable channels.

FIG. 5 illustrates another embodiment of a method 500 associated with reassigning signals of a cable when a cable channel fails. The method begins, at 505, by transmitting and receiving signals to a cable channel. At 510, one or more cable channels are tested. A determination is made, at 515, whether a cable channel was found inoperable when tested. If the cable channel was determined to be operating as normal, then flow returns back to block 510 where other channels are tested and/or the method waits until testing is re-initiated.

If a cable channel was found inoperable at block 515, then flow continues to block 520 where a new cable channel(s) are assigned. In one embodiment, the reassignments may be made as discussed above. For example, signals from a failed channel are reassigned to another available channel. At 525, a determination is made as to whether fewer channels were assigned subsequent to the inoperable channel being detected at 515. This can be the case where there are no available unused channels left in the cable and the communication protocol is changed in order to use fewer channels. If there are not fewer channels after the reassignment, then the new signal channels are rerouted, at 530, with the same signaling speed as originally used (e.g. before the cable channel failed). However, if fewer channels are reassigned than before, then the new signal channels are rerouted, at 535, with a slower signaling speed than originally used.

It will be appreciated that in one embodiment, the methods herein may be implemented as computer executable instructions. Thus, in one example, a computer-readable medium may store computer executable instructions that if executed by a machine (e.g., processor, device) cause the machine to perform a method that includes detecting a failed cable channel and reassigning signals to the cable channels.

Figure 6:
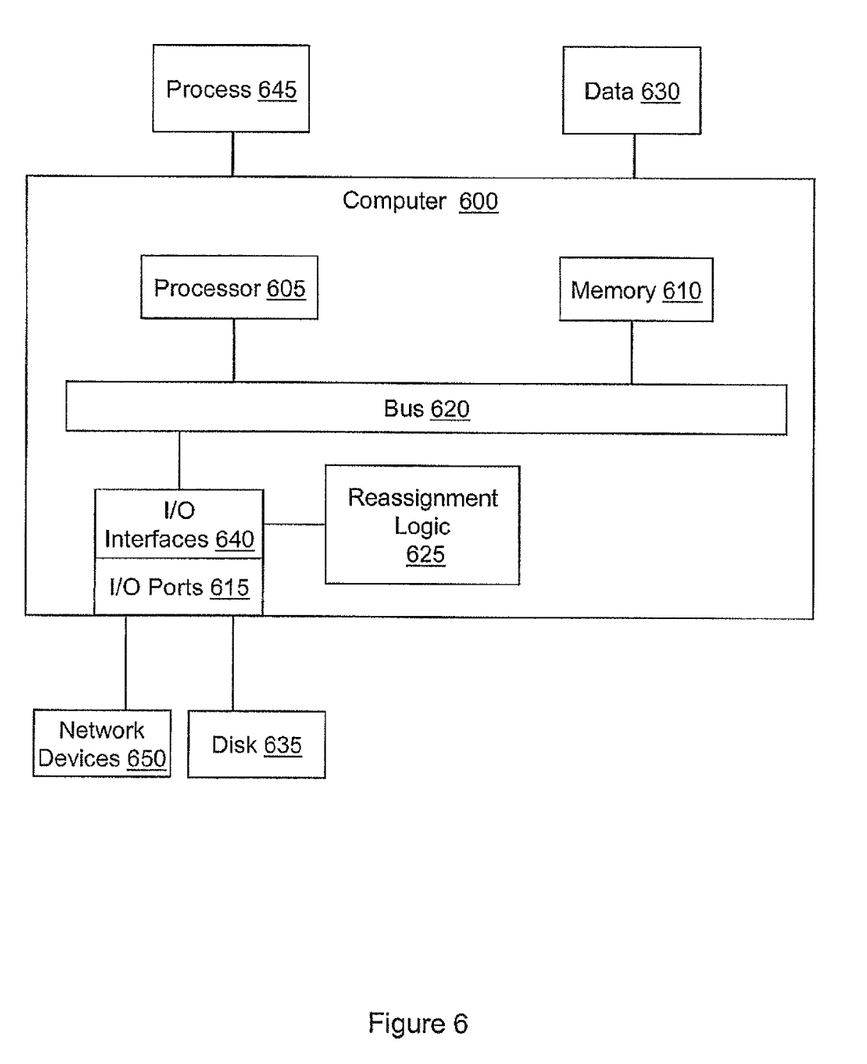
FIG. 6 illustrates one embodiment of a computing environment in which example systems and methods, and equivalents associated with reassigning signals to cable channels may be implemented.

FIG. 6 illustrates an example computing device in which example systems and methods described herein, and equivalents, may be implemented and operate. The example computing device may be a computer 600 that includes a processor 605, a memory 610, and input/output ports 615 operably connected by a bus 620. In one example, the computer 600 may include a reassignment logic 625 configured to reassign signals to cable channels. In one embodiment, the reassignment logic 625 is implemented as the switching logic 130. A network device 650 is implemented as the network device 100 (of FIG. 1 or 2), the PHY-Transceiver 300 (of FIG. 3), or combinations and equivalents thereof. In different examples, the network device 650 may be implemented in hardware, software, firmware, and/or combinations thereof.

The reassignment logic 625 provides a means (e.g., hardware, stored software, firmware) of identifying an inoperable cable channel and reassigning signals on that channel to another channel. In operation, the reassignment logic 625 identifies an inoperable cable channel in a cable (not shown) that is in communication with the reassignment logic or to the computer 600 through an input/output port 615. After an inoperable channel is detected, the reassignment logic will reassign the signal from the inoperable channel to another operable channel.

The logic may be implemented, for example, as an ASIC or other type of circuit. The logic may also be implemented as computer executable instructions that are stored and processed by a processor.

Generally describing an example configuration of the computer 600, the processor 605 may be a variety of various processors including dual microprocessor and other multi-processor architectures. A memory 610 may include volatile memory and/or non-volatile memory. Non-volatile memory may include, for example, ROM, PROM, EPROM, EEPROM, and so on. Volatile memory may include, for example, RAM, SRAM, DRAM, and so on.

A disk 635 may be operably connected to the computer 600 via, for example, an input/output interface (e.g., card, device) 640 and the input/output port 615. The disk 635 may be, for example, a magnetic disk drive, a solid state disk drive, a floppy disk drive, a tape drive, a Zip drive, a flash memory card, a memory stick, and so on. Furthermore, the disk 635 may be a CD-ROM drive, a CD-R drive, a CD-RW drive, a DVD ROM, and so on. The memory 610 can store a process 645 and/or a data 630, for example. The disk 635 and/or the memory 610 can store an operating system that controls and allocates resources of the computer 600.

The bus 620 may be a single internal bus interconnect architecture and/or other bus or mesh architectures. While a single bus is illustrated, it is to be appreciated that the computer 600 may communicate with various devices, logics, and peripherals using other busses (e.g., PCIE, 1394, USB, Ethernet). The bus 620 can be types including, for example, a memory bus, a memory controller, a peripheral bus, an external bus, a crossbar switch, and/or a local bus.

The computer 600 may interact with input/output devices via the I/O interfaces 640 including the reassignment logic 625 and the input/output ports 615. Input/output devices may be, for example, a keyboard, a microphone, a pointing and selection device, cameras, video cards, displays, the disk 635, the network devices 650, and so on. The input/output ports 615 may include, for example, serial ports, parallel ports, and USB ports.

The computer 600 can operate in a network environment and thus may be connected to the network devices 650 via the i/o interfaces 640, and/or the i/o ports 615. Through the network devices 650, the computer 600 may interact with a network. Through the network, the computer 600 may be logically connected to remote computers. Networks with which the computer 600 may interact include, but are not limited to, a LAN, a WAN, and other networks.

While example systems, methods, and so on have been illustrated by describing examples, and while the examples have been described in considerable detail, it is not the intention of the applicants to restrict or in any way limit the scope of the appended claimS to such detail. It is, of course, not possible to describe every conceivable combination of components or methodologies for purposes of describing the systems, methods, and so on described herein. Therefore, the invention is not limited to the specific details, the representative apparatus, and illustrative examples shown and described. Thus, this application is intended to embrace alterations, modifications, and variations that fall within the scope of the appended claims.

To the extent that the term "includes" or "including" is employed in the detailed description or the claims, it is intended to be inclusive in a manner similar to the term "comprising" as that term is interpreted when employed as a transitional word in a claim.

What is claimed is:

1. A networking device, comprising:
    a network interface to connect to an active cable and communicate over the active cable to a remote terminal, where the active cable includes two or more cable channels to carry signals;
    a timer configured to monitor the two or more cable channels and to maintain a time value indicating a time since detecting previous signal activity on a cable channel;
    a cable tester to test a first cable channel of the two or more cable channels upon a time value for the first cable channel exceeding a predetermined threshold value for inactivity, wherein the cable tester is configured to detect whether the first cable channel has failed; and
    a switching logic to reassign signals initially carried on the first cable channel to a second cable channel in the active cable upon detecting that the first cable channel has failed.

2. The network device of claim 1, further including a negotiation logic to negotiate with the remote terminal to reassign the signals from the first cable channel to the second cable channel.

3. The networking device of claim 2, where the negotiation logic is configured to negotiate assigning fewer signals on fewer cable channels in the active cable, upon detecting the failed cable channel.

4. The networking device of claim 2, where the negotiation logic is configured to negotiate operating the two or more cable channels at a lower operating speed, upon detecting the failed cable channel.

5. The network device of claim 2, where negotiation logic is configured to use at least one channel that is operational to communicate with the remote terminal.

6. The network device of claim 1, where the network interface is operable to be configured to communicate signals to the active cable as defined by the 1000Base-T signaling standard and is further operable to be configured to communicate signals to the active cable at speeds defined by a 100Base-TX signaling standard or 10Base-T signaling standard, upon detecting the failed cable channel.

7. The networking device of claim 1, where the switching logic is configured to cause the network interface to reconfigure signal communications from a first communication protocol to a different communication protocol that does not use the failed cable channel.

8. The networking device of claim 1, where the network interface is operable to interface with a registered jack 45 (RJ45) having eight pins representing cable channels one, two, three and four, where the switching logic is configured to connect the first cable channel to pin numbers four and five, the second cable channel to pin numbers three and six, the third cable channel to pin numbers one and two, and the forth cable channel to pin numbers seven and eight.

9. The networking device of claim 8, where the switching logic is operable to reassign a failed cable channel on cable channels two or three to channels one or four.

10. The networking device of claim 1, where the timer is configured to monitor the two or more cable channels while the two or more cable channels are designated to actively carry communications.

11. The networking device of claim 1, where the cable tester is configured to transmit a test signal on the first cable channel to measure a signal amplitude and to calculate a length the test signal travels, where the cable tester is configured to determine where the failed cable channel has failed based on the signal amplitude and the length.

12. The networking device of claim 11, where the cable tester is configured to measure an amplitude of a reflected signal derived from the test signal.

13. The network device of claim 1, where the network interface is operable to communicate the reassigned signals over the second cable channel at a slower speed than when the signals were communicated over the first cable channel.

14. The networking device of claim 1, where the network interface is configured to operate the first cable channel at about a 1000 Megabits/second rate and the network interface is configured to operate the second cable channel at about a 100 Megabits/second rate or about a 10 Megabits/second rate.

15. The networking device of claim 1, further including a negotiation logic operable to cause the remote terminal to be reconfigured to operate with the reassigned signals on the second channel.

16. The networking device of claim 1, where the networking device is at least one of Institute of Electrical and Electronic Engineers (IEEE) 802.3ab, 802.3i, and 802.3u compliant.

17. The networking device of claim 1, where the network interface is a transceiver.

18. The networking device of claim 1, where the network device is a PHY-Transceiver.

19. A method comprising:
transmitting and receiving signals over an active cable, where the active cable includes multiple cable channels;
determining that a first cable channel is inoperable by testing the first cable channel using at least a test signal, wherein the test signal is transmitted on the first cable channel when a timer for the first cable channel exceeds a predetermined value after a period of inactivity on the first cable channel; and
reassigning signals initially carried on the first cable channel to a second cable channel in the active cable.

20. The method of claim 19, where the transmitting and receiving is performed by a local PHY-Transceiver connected at one end of the active cable that communicates with a remote PHY-Transceiver connected to the active cable; the method further including:
responsive to determining that the first cable channel is inoperative, causing the remote PHY-Transceiver to negotiate the reassignment of signals to the second cable channel.

21. The method of claim 20, where the causing the remote PHY-Transceiver to negotiate the second cable channel includes negotiating a slower signaling speed for signals transmitted and received from the active cable.

22. The method of claim 20, causing the remote PHY-Transceiver to negotiate the second cable channel that is available.

23. The method of claim 22, where the second cable channel is a previously unused cable channel.

24. The method of claim 19, where the reassigning includes reconfiguring signal communications from a first communication protocol to a different communication protocol that does not use the failed cable channel.

25. The method of claim 19, further including transmitting a test signal on the first cable channel to measure a signal amplitude, calculate a length of the active cable in which the test signal travels, and determine a first cable channel status based on the measured amplitude and the length.

26. The method of claim 25, further including measuring the signal amplitude of a reflected signal derived from the test signal.

27. The method of claim 19, where the multiple cable channels are designated to actively carry signals.

28. The method of claim 19, further including transmitting the signals to be compatible with two or more twisted pairs of wire corresponding to the two or more channels.

29. The method of claim 19, where the reassigning further includes reassigning the signals to use a fewer number of cable channels after the reassigning than before the reassigning.

30. The method of claim 19, where the transmitting includes transmitting the signals at about a 1000 Megabits/second speed before the reassigning and at about a 10 Megabits/second speed or about a 100 Megabits/second speed after the reassigning.

31. The method of claim 19, further including negotiating with a remote terminal so that fewer cable channels are used for communication than before the first cable channel was determined inoperable.

32. A PHY-Transceiver comprising:
a port to connect to an active cable and communicate over the active cable to a remote PHY-Transceiver, where the active cable includes two or more twisted pairs of wire to carry signals;
a cable tester to test the two or more twisted pairs of wire to detect a twisted pair that has failed;
a timer configured to monitor the two or more twisted pairs in the active cable and to maintain a time value for each twisted pair that indicates a time since detecting previous signal activity, wherein the timer is configured to trigger the cable tester to test a twisted pair upon a time value for the twisted pair exceeding a predetermined time value; and
a switching logic to reassign signals initially carried on a first twisted pair of wire in the active cable to a second twisted pair of wire in the active cable upon detecting that the first twisted pair of wire has failed.

33. The PHY-Transceiver of claim 32, further including a negotiation logic to negotiate the second twisted pair with the remote PHY-Transceiver.

34. The PHY-Transceiver of claim 33, where the negotiation logic is configured to negotiate to carry fewer signals on fewer twisted pairs in the active cable.

35. The PHY-Transceiver of claim 33, where the negotiation logic negotiates to operate the twisted pairs at a lower operating speed, upon detecting the failed twisted pair.

36. The PHY-Transceiver of claim 33, where the negotiation logic is configured to use at least one twisted pair that is operational to communicate with the remote PHY-Transceiver.

37. The PHY-Transceiver of claim 32, where the switching logic is configured to reassign signals by causing the transceiver to reconfigure signal communications from a first communication protocol to a different communication protocol that does not use a twisted pair that has failed.

38. The PHY-Transceiver of claim 32, where the timer is configured to monitor the two or more twisted pairs while the two or more twisted pairs are designated to actively carry signals.

39. The PHY-Transceiver of claim 38, where the registered jack 45 has eight pins, where the switching logic connects a first twisted wire pair to pin numbers four and five, a second twisted wire pair to pin numbers three and six, a third twisted wire pair to pin numbers one and two, and a forth twisted wire pair to pin numbers seven and eight.

40. The PHY-Transceiver of claim 39, where the switching logic is operable to route the first cable channel to either twisted wire pairs two or three and the second cable channel to either twisted wire pairs one or four.

41. The PHY-Transceiver of claim 32, where the switching logic is further configured to reconfigure the PHY-Transceiver to reroute signals from the failed twisted pair to the second twisted pair.

42. The PHY-Transceiver of claim 32, where a signal sent from the PHY-Transceiver to the remote PHY-Transceiver causes the remote PHY-Transceiver to reconfigure the remote PHY-Transceiver to reassigning signals at the remote PHY-Transceiver initially carried on the failed twisted pair to the second twisted pair.

\* \* \* \* \*